(12) United States Patent (10) Patent No.: US 12,580,281 B2

Nagata (45) Date of Patent: Mar. 17, 2026

(54) BATTERY WITH CURRENT COLLECTION TAB AND CURRENT COLLECTION TERMINAL

(71) Applicant: TOYOTA JIDOSHA KABUSHIKI KAISHA, Toyota (JP)

(72) Inventor: Yuka Nagata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 468 days.

(21) Appl. No.: 18/143,896

(22) Filed: May 5, 2023

(65) Prior Publication Data

US 2024/0021963 A1 Jan. 18, 2024

(30) Foreign Application Priority Data

Jul. 15, 2022 (JP) ................................. 2022-113903

(51) Int. Cl.
| | |
|---|---|
| *H01M 50/54* | (2021.01) |
| *H01M 10/0525* | (2010.01) |
| *H01M 10/0562* | (2010.01) |
| *H01M 50/193* | (2021.01) |
| *H01M 50/562* | (2021.01) |

(52) U.S. Cl.
CPC ....... *H01M 50/54* (2021.01); *H01M 10/0525* (2013.01); *H01M 10/0562* (2013.01); *H01M 50/193* (2021.01); *H01M 50/562* (2021.01)

(58) Field of Classification Search
CPC .. H01M 50/54; H01M 50/193; H01M 50/562; H01M 10/0525; H01M 10/0562
See application file for complete search history.

(56) References Cited

U.S. PATENT DOCUMENTS

| | | |
|---|---|---|
| 2007/0009794 A1 | 1/2007 | Takami et al. |
| 2020/0168943 A1 | 5/2020 | Rho et al. |
| | (Continued) | |

FOREIGN PATENT DOCUMENTS

| | | |
|---|---|---|
| JP | 2002-025535 A | 1/2002 |
| JP | 2005-158264 A | 6/2005 |
| | (Continued) | |

OTHER PUBLICATIONS

JP 2018160310 English Translation (Year: 2018).*
JP 2020155301 English Translation (Year: 2020).*

*Primary Examiner* — Jimmy Vo

(74) *Attorney, Agent, or Firm* — Dinsmore & Shohl LLP

(57) ABSTRACT

The present disclosure solves the problem by providing a battery including: an electrode body; a current collection terminal disposed at a side surface portion of the electrode body; and a laminate film covering the electrode body and the current collection terminal, in which: the electrode body includes a current collection tab; the current collection tab and the current collection terminal are electrically connected; the laminate film includes a metal layer and an inner resin layer closer to the current collection terminal than the metal layer is; the current collection terminal includes a base portion and a porous portion closer to the laminate film than the base portion is; a resin layer including the inner resin layer is disposed between the base portion and the metal layer; the porous portion and the resin layer contact; and at least a part of the resin layer fills the interior of the porous portion.

8 Claims, 2 Drawing Sheets

(56)     References Cited

U.S. PATENT DOCUMENTS

| | | |
|---|---|---|
| 2020/0280028 A1 | 9/2020 | Ehara et al. |
| 2022/0102761 A1 | 3/2022 | Han et al. |
| 2023/0261290 A1 | 8/2023 | Okano et al. |

FOREIGN PATENT DOCUMENTS

| | | | |
|---|---|---|---|
| JP | 2007-018881 A | | 1/2007 |
| JP | 2011-060456 A | | 3/2011 |
| JP | 2014-017175 A | | 1/2014 |
| JP | 2014-154397 A | | 8/2014 |
| JP | 2014-179193 A | | 9/2014 |
| JP | 2018160310 A | * | 10/2018 |
| JP | 2019-194949 A | | 11/2019 |
| JP | 2020-140887 A | | 9/2020 |
| JP | 2020155301 A | * | 9/2020 |
| WO | 2022/004729 A1 | | 1/2022 |

* cited by examiner

BATTERY WITH CURRENT COLLECTION TAB AND CURRENT COLLECTION TERMINAL

CROSS-REFERENCE TO RELATED APPLICATION

This application claims priority to Japanese Patent Application No. 2022-113903 filed on Jul. 15, 2022, incorporated herein by reference in its entirety.

BACKGROUND

1. Technical Field

The present disclosure relates to a battery.

2. Description of Related Art

Generally, a battery such as a lithium-ion secondary battery includes an electrode body that includes a positive-electrode current collector, a positive-electrode active material layer, an electrolyte layer, a negative-electrode active material layer and a negative-electrode current collector. For example, the electrode body is sealed in an internal space that is surrounded by an exterior material. Japanese Unexamined Patent Application Publication No. 2019-194949 (JP 2019-194949 A) discloses a laminate battery that includes an electrode body, a laminate exterior material and a tab film, and discloses that the tab film is disposed between a terminal portion of the electrode body and an edge portion of the laminate exterior material. Japanese Unexamined Patent Application Publication No. 2020-140887 (JP 2020-140887 A) discloses a sealed battery in which a rough surface (for example, an alumite layer) including a plurality of concave portions is formed on at least one of an internal terminal surface and an external terminal surface that are overlapped with a plated layer interposed and in which a part of the plated layer enters the concave portion. Japanese Unexamined Patent Application Publication No. 2014-154397 (JP 2014-154397 A) discloses a non-aqueous electrolyte secondary battery in which a terminal holder made of resin and a current collection terminal are fixed by thermal caulking, and discloses that an alumite treatment is performed to a surface of the current collection terminal on the terminal holder side. Japanese Unexamined Patent Application Publication No. 2011-060456 (JP 2011-060456 A) discloses a bipolar battery that includes current collection plates respectively disposed on both ends of an electricity generation element along a stack direction in which bipolar electrodes are stacked, and discloses that an alumite treatment is performed to outer surfaces of the current collection plates.

SUMMARY

As described above, JP 2019-194949 A disposes that the tab film is disposed between the terminal portion (current collection terminal) of the electrode body and the edge portion of the laminate exterior material (laminate film). By providing the tab film, the adhesion between the current collection terminal and the laminate film increases. However, moisture easily enters the internal region sealed by the laminate film, through a resin layer such as the tab film.

The present disclosure has been made in view of the above circumstance, and has a main object to provide a battery that can restrain the entrance of moisture.

[1] A battery including: an electrode body; a current collection terminal that is disposed at a side surface portion of the electrode body; and a laminate film that covers the electrode body and the current collection terminal, in which: the electrode body includes a current collection tab; the current collection tab and the current collection terminal are electrically connected; the laminate film includes a metal layer and an inner resin layer that is closer to the current collection terminal than the metal layer is; the current collection terminal includes a base portion and a porous portion that is closer to the laminate film than the base portion is; a resin layer including the inner resin layer is disposed between the base portion and the metal layer; the porous portion and the resin layer contact each other; and at least a part of the resin layer fills the interior of the porous portion.

[2] The battery according to [1], in which: the current collection terminal contains aluminum; and the porous portion is an alumite portion.

[3] The battery according to [1] or [2], in which the electrode body contains a solid electrolyte.

[4] The battery according to [3], in which the solid electrolyte is a sulfide solid electrolyte.

The battery in the present disclosure exerts an effect of restraining the entrance of moisture.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
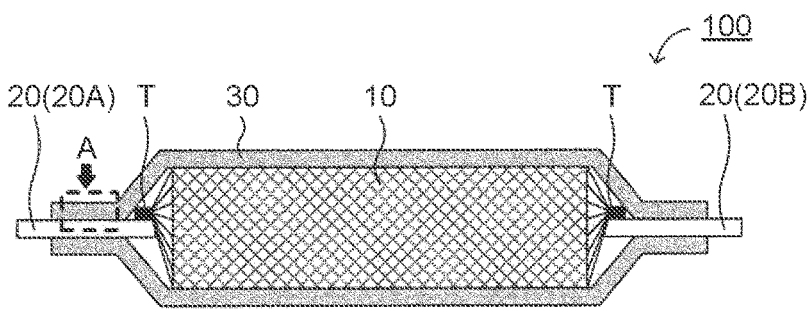
FIG. 1 is a schematic sectional view illustrating a battery in the present disclosure.

An embodiment of the present disclosure will be described below in detail, with use of the drawings. The figures in the drawings are schematically shown, and to facilitate understanding, the size and shape of each part are exaggerated when appropriate. Further, in the present specification, when "upper side" or "lower side" is merely written as an expression of a manner in which a different member is disposed relative to a certain member, the expression includes both a case where the different member is disposed on or under the certain member so as to contact the certain member and a case where the different member is disposed above or below the certain member while another member is interposed, unless otherwise specified.

FIG. 1 is a schematic sectional view illustrating a battery in the present disclosure. A battery 100 shown in FIG. 1 includes an electrode body 10, current collection terminals 20 that are disposed at side surface portions of the electrode body 10, and a laminate film 30 that covers the electrode body 10 and the current collection terminals 20. The electrode body 10 includes current collection tabs T, and the current collection tabs T and the current collection terminals 20 are electrically connected.

Figure 2:
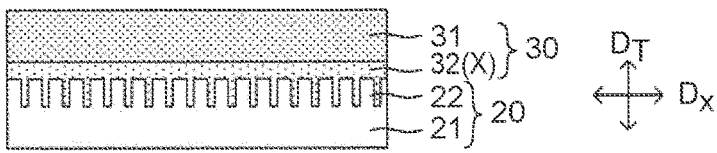
FIG. 2 is an enlarged view of a region A in FIG. 1.

FIG. 2 is an enlarged view of a region A in FIG. 1. As shown in FIG. 2, a laminate film 30 includes a metal layer 31 and an inner resin layer 32 that is closer to the current collection terminal 20 than the metal layer 31 is. The current collection terminal 20 includes a base portion 21 and a porous portion 22 that is closer to the laminate film 30 than the base portion 21 is. A resin layer X including the inner resin layer 32 is disposed between the base portion 21 and the metal layer 31. The porous portion 22 and the resin layer X contact each other, and at least a part of the resin layer X fills the interior of the porous portion 22.

Since at least a part of the resin layer fills the interior of the porous portion, the present disclosure provides a battery that can restrain the entrance of moisture. As described above, JP 2019-194949 A discloses that the tab film is disposed between the terminal portion (the current collection terminal) of the electrode body and the edge portion of the laminate exterior material (the laminate film). By providing the tab film, the adhesion between the current collection terminal and the laminate film increases. However, moisture easily enters the internal region sealed by the laminate film, through a resin layer such as the tab film.

Figure 3A:
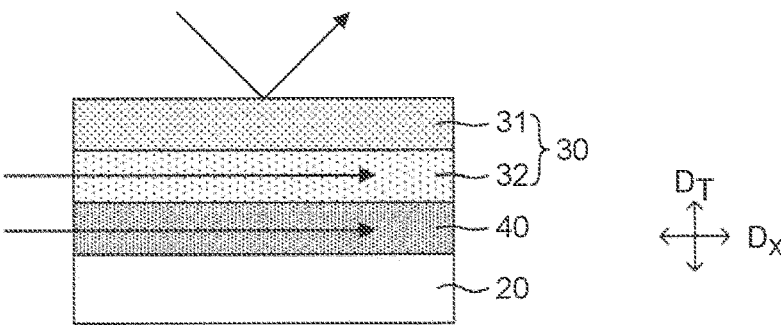
FIG. 3A is an explanatory diagram for illustrating a problem in the present disclosure.

For example, when the laminate film 30 and the current collection terminal are welded through a tab film 40 as shown in FIG. 3A, the adhesion between the laminate film 30 and the current collection terminal 20 increases. Further, the metal layer 31 of the laminate film 30 generally does not have moisture permeability, and therefore, unless a damage such as a crack is generated on the metal layer 31, moisture does not enter the interior of the laminate film 30 from the exterior of the laminate film 30.

On the other hand, the inner resin layer 32 of the laminate film 30 and the tab film 40 have higher permeabilities than the metal layer 31. Therefore, the entrance of moisture occurs in a direction Dx orthogonal to a thickness direction DT. The entrance of moisture in the direction Dx depends on the sectional area of the resin layer (the inner resin layer 32 and the tab film 40) in the direction Dx. As the sectional area is larger, the entrance of moisture occurs more easily. In response, as shown in FIG. 2, the porous portion 22 is provided in the current collection terminal 20, and the interior of the porous portion 22 is filled with the resin layer X. Thereby, the sectional area of the resin layer X (the inner resin layer 32) in the direction Dx becomes small. Therefore, the battery can restrain the entrance of moisture.

Figure 3B:
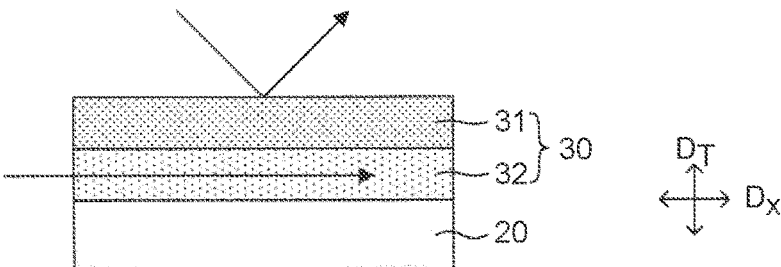
FIG. 3B is an explanatory diagram for illustrating a problem in the present disclosure.

In the case where the current collection terminal 20 and the inner resin layer 32 contact each other as shown in FIG. 3B, the sectional area of the resin layer X (the inner resin layer 32) in the direction Dx is smaller than in the case of the use of the tab film. On the other hand, the adhesion between the current collection terminal and the laminate film is lower than in the case of the use of the tab film. In response, as shown in FIG. 2, the porous portion 22 is provided in the current collection terminal 20, and the interior of the porous portion 22 is filled with the resin layer X. Thereby, the anchor effect is produced, and the adhesion between the current collection terminal 20 and the laminate film 30 becomes high.

1. Configuration of Battery

The battery in the present disclosure includes at least the electrode body, the current collection terminal and the laminate film.

(1) Electrode Body

Figure 4A:
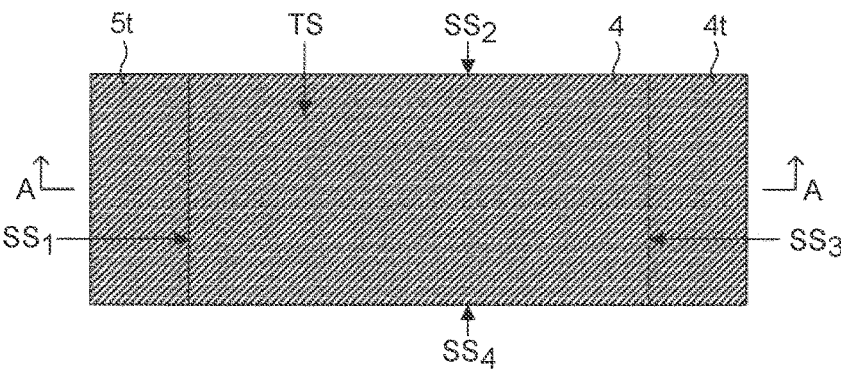
FIG. 4A is a schematic plan view illustrating an electrode body in the present disclosure.
Figure 4B:
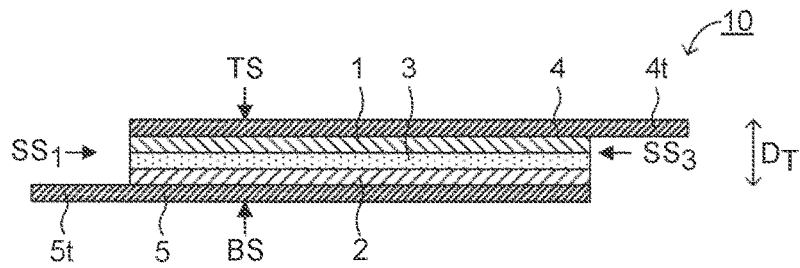
FIG. 4B is a schematic sectional view illustrating the electrode body in the present disclosure.

The electrode body in the present disclosure functions as an electricity generation element of the battery. For example, as shown in FIG. 4A and FIG. 4B, the electrode body 10 includes a positive-electrode active material layer 1, a negative-electrode active material layer 2, an electrolyte layer 3 that is disposed between the positive-electrode active material layer 1 and the negative-electrode active material layer 2, a positive-electrode current collector 4 that performs current collection for the positive-electrode active material layer 1, and a negative-electrode current collector 5 that performs current collection for the negative-electrode active material layer 2. Further, the electrode body 10 shown in FIG. 4A and FIG. 4B includes the positive-electrode current collector 4, the positive-electrode active material layer 1, the electrolyte layer 3, the negative-electrode active material layer 2 and the negative-electrode current collector 5, in this order, in the thickness direction DT.

As shown in FIG. 4A and FIG. 4B, the electrode body 10 may include a top surface portion TS, a bottom surface portion BS that faces the top surface portion TS, and four side surface portions SS (a first side surface portion $SS_1$, a second side surface portion $SS_2$, a third side surface portion $SS_3$ and a fourth side surface portion $SS_4$) that link the top surface portion TS and the bottom surface portion BS. Each of the top surface portion and the bottom surface portion corresponds to a primary surface of the electrode body, and the thickness direction can be defined as the normal direction of the primary direction.

Examples of the shape of the top surface portion include, but are not particularly limited to, a quadrangle such as a square, a rectangle, a rhomboid, a trapezoid and a parallelogram. Further, the shape of the top surface portion may be a polygon other than a quadrangle, or may be a shape having a curve line, as exemplified by a circle. Further, the shape of the bottom surface portion is the same as the shape of the top surface portion. Examples of the shape of the side surface portion include, but are not particularly limited to, a quadrangle such as a square, a rectangle, a rhomboid, a trapezoid and a parallelogram.

As shown in FIG. 4A and FIG. 4B, the electrode body 10 includes a positive-electrode current collection tab $4t$ for the connection with a positive-electrode current collection terminal (not illustrated) and a negative-electrode current collection tab $5t$ for the connection with a negative-electrode current collection terminal (not illustrated). The positive-electrode current collection tab $4t$ extends from the first side surface portion $SS_1$ facing the positive-electrode current collection terminal (not illustrated), in a direction crossing the thickness direction DT. The negative-electrode current collection tab $5t$ extends from the third side surface portion $SS_3$ facing the negative-electrode current collection terminal (not illustrated), in a direction crossing the thickness direction DT.

(2) Laminate Film and Current Collection Terminal

The laminate film in the present disclosure is a member that covers the electrode body and the current collection terminals. As shown in FIG. 2, the laminate film includes the metal layer 31 and the inner resin layer 32 that is closer to the current collection terminal 20 than the metal layer 31 is. Although not illustrated, the laminate film may include an outer resin layer on the opposite side of the metal layer from the inner resin layer.

The current collection terminal in the present disclosure is disposed at the side surface portion of the electrode body. In some embodiments, the battery may include two current collection terminals for one electrode body. For example, as shown in FIG. 1, for the electrode body 10, a pair of current collection terminals 20 (a positive-electrode current collection terminal 20A and a negative-electrode current collection terminal 20B) may be disposed so as to face each other. Further, in FIG. 1, the pair of current collection terminals 20 is disposed in such a manner that the current collection terminals 20 face each other in the longitudinal direction of the electrode body 10.

As shown in FIG. 2, the current collection terminal 20 includes the base portion 21 and the porous portion 22 that is closer to the laminate film 30 than the base portion 21 is. The porous portion 22 is a site where there are many hole portions (pores). The many hole portions (pores) may be linked three-dimensionally. For example, the average micropore diameter of the pores is 1 nm or more and 1000 nm or less. The average micropore diameter of the pores may be 5 nm or more and 500 nm or less. The average micropore diameter of the pores may be 10 nm or more and 100 nm or less. For example, the average micropore diameter of the pores is evaluated by a mercury intrusion porosimeter. In some embodiments, the base portion 21 and the porous portion 22 may be continuously formed.

Examples of the method for forming the porous portion include an anodization treatment. The anodization treatment is a treatment in which the electrochemical oxidation at the anode is used. Examples of the anodization treatment include an alumite treatment. The alumite treatment is a method in which an oxide film (anodized oxide film) is formed on a surface of aluminum using the electrochemical oxidation. In some embodiments, the current collection terminal may contain aluminum and the porous portion may be an alumite portion. The alumite portion contains aluminum oxide.

Figure 5:
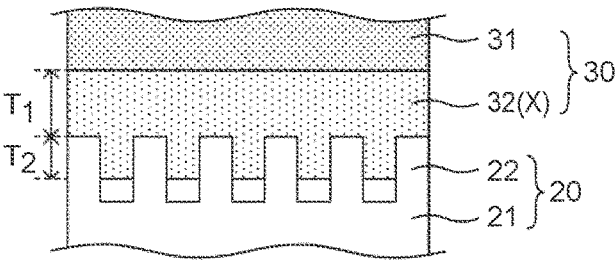
FIG. 5 is a schematic sectional view illustrating a part of a current collection terminal in the present disclosure.

As shown in FIG. 5, the resin layer X including the inner resin layer 32 is disposed between the base portion 21 of the current collection terminal 20 and the metal layer 31 of the laminate film 30. As shown in FIG. 5, the resin layer X may be constituted by only the inner resin layer 32. The inner resin layer 32 may be constituted by a single layer, or may be constituted by a plurality of layers. Further, although not illustrated, another resin layer Y may be disposed between the inner resin layer and the base portion 21. Even when the resin layer Y is disposed, it is possible to obtain a battery that can restrain the entrance of moisture by the use for a current collection terminal including the porous portions, compared to a case of the use for a current collection terminal including no porous portion.

As shown in FIG. 5, the porous portion 22 and the resin layer X contact each other, and at least a part of the resin layer X fills the interior of the porous portion 22. A part of the resin layer X may fill the interior of the porous portion 22, or the whole of the resin layer X may fill the interior of the porous portion 22. Here, $T_1$ is defined as the thickness of the resin layer X existing between the metal layer 31 and the current collection terminal 20, and $T_2$ is defined as the thickness of the resin layer X filling the porous portion 22. $T_1$ may be zero, or may be larger than zero. In the case where $T_1$ is larger than zero, for example, $T_1$ may be 10 μm or more, and may be 20 μm or more. Moreover, for example, $T_1$ is 100 μm or less, and $T_1$ may be 80 μm or less, and may be 60 μm or less. $T_2$ is generally larger than zero, and $T_2$ may be 50 nm or more, and may be 100 nm or more. Moreover, for example, $T_2$ is 1 μm or less, and may be 300 nm or less. Further, $T_1$ may be larger than $T_2$. Further, as shown in FIG. 5, the resin layer X may fill a partial region on the metal layer 31 side in the porous portion 22. Although not illustrated, the resin layer X may fill the whole of the porous portion.

Figure 6:
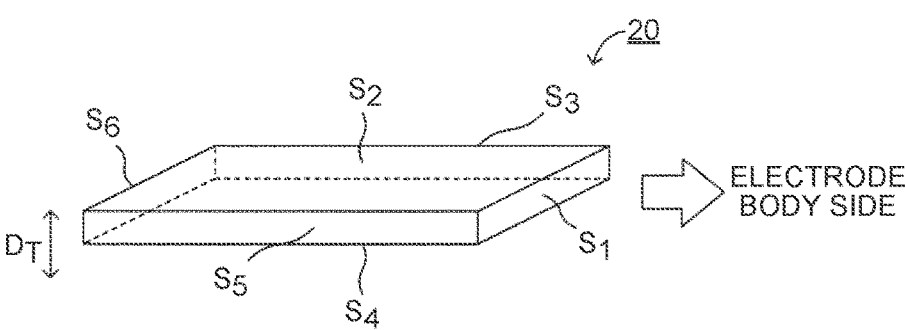
FIG. 6 is a schematic perspective view illustrating the current collection terminal in the present disclosure.

As shown in FIG. 6, the current collection terminal 20 may include a first surface $S_1$ that faces the electrode body, and a plurality of surfaces (a second surface $S_2$ to a fifth surface $S_5$) that constitute the outer edge of the first surface $S_1$. Furthermore, the current collection terminal 20 shown in FIG. 6 includes a sixth surface $S_6$ that faces the first surface $S_1$. The current collection terminal 20 shown in FIG. 6 includes the second surface $S_2$ and the fourth surface $S_4$, as principal surfaces.

In some embodiments, in the case where the current collection terminal 20 includes the second surface $S_2$ to the fifth surface $S_5$ as shown in FIG. 6, the above-described porous portion may be formed on at least one of the second surface $S_2$ to the fifth surface $S_5$. Each of the second surface $S_2$ and the fourth surface $S_4$ may be a surface that has a normal direction parallel to the thickness direction DT. "Parallel" means a relation in which the angle (acute angle side) between the two directions is 10° or less. The porous portion may be formed only on the second surface $S_2$ and the fourth surface $S_4$. Each of the third surface $S_3$ and the fifth surface $S_5$ may be a surface that has a normal direction orthogonal to the thickness direction DT. "Orthogonal" means a relation in which the angle (acute angle side) between the two directions is 80° or more and 90° or less. The porous portion may be formed only on the third surface $S_3$ and the fifth surface $S_5$. As for the third surface $S_3$ and the fifth surface $S_5$ shown in FIG. 6, the length in the thickness direction DT is short (the thickness of the current collection terminal 20 is small), but the length in the thickness direction DT may be longer. Further, the porous portion may be formed on the whole surface of the current collection terminal 20.

The current collection terminal in the present disclosure includes a joining region for joining the current collection terminal to the current collection tab. In some embodiments, the porous portion may be not formed at the joining region. In some embodiments, for example, in the case where the porous portion is a metal oxide, the porous portion may be not formed at the joining region, for resistance reduction. For example, in the case where the joining region is formed on the second surface $S_2$ shown in FIG. 6, no porous portion may be formed at the joining region, and the porous portion may be formed on the outside (the opposite side of the electrode body) of the joining region. In this way, the porous portion may be formed on one surface in a pattern manner. Further, for example, in the case where the joining region is formed on the first surface $S_1$ shown in FIG. 6, no porous portion may be formed at the joining region, and the porous portion may be formed on at least one of the surfaces (the second surface $S_2$ to the fifth surface $S_5$) that constitute the outer edge of the first surface $S_1$. In this case, it is allowable to adopt a configuration in which the porous portion is not formed on the first surface $S_1$ at all.

2. Members of Battery

The battery in the present disclosure includes the electrode body, the current collection terminal and the laminate film.

(1) Electrode Body

For example, as shown in FIG. 4A and FIG. 4B, the electrode body 10 in the present disclosure includes the positive-electrode active material layer 1, the negative-electrode active material layer 2, the electrolyte layer 3 that is disposed between the positive-electrode active material layer 1 and the negative-electrode active material layer 2, the positive-electrode current collector 4 that performs current collection for the positive-electrode active material layer 1, and the negative-electrode current collector 5 that performs current collection for the negative-electrode active material layer 2. The electrode body 10 may include a bipolar electrode, or may include no bipolar electrode.

The positive-electrode active material layer contains at least a positive-electrode active material. The positive-electrode active material layer may further contain at least one of an electric conductive material, an electrolyte and a binder. Examples of the positive-electrode active material include an oxide active material. Examples of the oxide active material include a layered rock salt type active material such as $LiNi_{1/3}Co_{1/3}Mn_{1/3}O_2$, a spinel type active material such as $LiMn_2O_4$, and an olivine type active material such as $LiFePO_4$. Further, sulfur (S) may be used as the positive-electrode active material. For example, the shape of the positive-electrode active material is a particle shape.

Examples of the electric conductive material include a carbon material. The electrolyte may be a solid electrolyte, or may be a liquid electrolyte. The solid electrolyte may be an organic solid electrolyte such as a gel electrolyte, or may be an inorganic solid electrolyte such as an oxide solid electrolyte and a sulfide solid electrolyte. Particularly, the performance of the sulfide solid electrolyte significantly decreases due to moisture, and therefore the electrode body containing the sulfide solid electrolyte requires the prevention of the entrance of moisture. For example, the liquid electrolyte (electrolytic solution) contains a supporting salt such as $LiPF_6$ and a solvent such as a carbonate solvent. Examples of the binder include a rubber binder and a fluoride binder.

The negative-electrode active material layer contains at least a negative-electrode active material. The negative-electrode active material layer may further contain at least one of an electric conductive material, an electrolyte and a binder. Examples of the negative-electrode active material include a metal active material such as Li and Si, a carbon active material such as graphite, and an oxide active material such as $Li_4Ti_5O_{12}$. For example, the shape of the negative-electrode active material is a particle shape or a foil shape. The electric conductive material, the electrolyte and the binder are the same as the above-described contents.

The electrolyte layer is disposed between the positive-electrode active material layer and the negative-electrode active material layer, and contains at least an electrolyte. The electrolyte may be a solid electrolyte, or may be a liquid electrolyte. The electrolyte is the same as the above-described contents. The electrolyte layer may include a separator.

The positive-electrode current collector performs current collection for the positive-electrode active material layer. Examples of the material of the positive-electrode current collector include a metal such as aluminum, aluminum alloys, stainless steel and nickel. Examples of the shape of the positive-electrode current collector include a foil shape and a mesh shape. The positive-electrode current collector includes the positive-electrode current collection tab for the connection with the positive-electrode current collection terminal. As shown in FIG. 4A and FIG. 4B, the positive-electrode current collection tab 4t may be formed so as to be continuous with the positive-electrode current collector 4. The positive-electrode current collection tab 4t is disposed at such a position that the positive-electrode current collection tab 4t does not overlap with the positive-electrode active material layer 1 when the electrode body 10 is viewed in the thickness direction DT.

The negative-electrode current collector performs current collection for the negative-electrode active material layer. Examples of the material of the negative-electrode current collector include a metal such as copper, stainless steel and nickel. Examples of the shape of the negative-electrode current collector include a foil shape and a mesh shape. The negative-electrode current collector includes the negative-electrode current collection tab for the connection with the negative-electrode current collection terminal. As shown in FIG. 4A and FIG. 4B, the negative-electrode current collection tab may be formed so as to be continuous with the negative-electrode current collector 5. The negative-electrode current collection tab 5t is disposed at such a position that the negative-electrode current collection tab 5t does not overlap with the negative-electrode active material layer 2 when the electrode body 10 is viewed in the thickness direction DT.

(2) Current Collection Terminal

The current collection terminal in the present disclosure is disposed at the side surface portion of the electrode body. Further, the current collection terminal may be disposed at such a position that the current collection terminal does not overlap with the electrode body (except the current collection tab) as planarly viewed in the thickness direction DT of the electrode body. The battery in the present disclosure generally includes the positive-electrode current collection terminal and the negative-electrode current collection terminal, as the current collection terminal. The current collection terminal includes a current collection portion at least at a part. The current collection portion and the electrode body are electrically connected through the current collection tab. The current collection portion may be the whole of the current collection terminal, or may be a part of the current collection terminal. Examples of the material of the current collection terminal include a metal such as aluminum, aluminum alloys and stainless steel.

(3) Laminate Film

The laminate film in the present disclosure includes the metal layer and the inner resin layer on one surface of the metal layer. The laminate film may include an outer resin layer on the opposite side of the metal layer from the inner resin layer. Examples of the material of the metal layer include aluminum, aluminum alloys and stainless steel. For example, the thickness of the metal layer is 30 μm or more and 60 μm or less. Examples of the material of the inner resin layer include a thermoplastic resin. Examples of the thermoplastic resin include an olefin resin such as polypropylene (PP) and polyethylene (PE). For example, the thickness of the inner resin layer is 40 μm or more and 100 μm or less. Examples of the material of the outer resin layer include an ester resin such as polyethylene terephthalate (PET), and an amide resin such as nylon. For example, the thickness of the outer resin layer is 20 μm or more and 60 μm or less. Further, for example, the thickness of the laminate film is 80 μm or more and 250 μm or less.

(4) Battery

The battery in the present disclosure is typically a lithium-ion secondary battery. In some embodiments, the battery may be an all-solid-state battery. The all-solid-state battery is a battery in which a solid electrolyte (particularly, an inorganic solid electrolyte) is used instead of an electrolytic solution. For example, the battery is used as an electric power source of a vehicle such as a hybrid electric vehicle (HEV), a plug-in hybrid electric vehicle (PHEV), a battery electric vehicle (BEV), a gasoline vehicle and a diesel vehicle. In some embodiments, the battery may be used as an electric power source for driving the hybrid electric vehicle (HEV), the plug-in hybrid electric vehicle (PHEV) and the battery electric vehicle (BEV). Further, the battery in the present disclosure may be used as an electric power source of a movable body (for example, a train, a ship or an airplane) other than the vehicle, or may be used as an electric power source of an electric product such as an information processing device.

The production method for the battery in the present disclosure is not particularly limited. For example, the electrode body and the current collection terminals are connected through the current collection tabs, the obtained member is covered with the laminate film, and the laminate film is thermally sealed under a reduced-pressure environment, so that the battery is obtained. The inner resin layer of the laminate film is welded to other members such as the current collection terminals, by heating. Further, at regions where the inner resin layers of the laminate films are in contact with each other, the inner resin layers are welded to each other by heating.

The present disclosure is not limited to the above embodiment. The above embodiment is an example, and the technical scope of the present disclosure includes all techniques that have configurations substantially identical to the technical idea described in the claims in the present disclosure and that exert the same function effects.

What is claimed is:

1. A battery comprising:
an electrode body;
a current collection terminal that is disposed at a side surface portion of the electrode body; and
a laminate film that covers the electrode body and the current collection terminal,
wherein:
the electrode body includes a current collection tab;
the current collection tab and the current collection terminal are electrically connected;
the laminate film includes a metal layer and an inner resin layer that is closer to the current collection terminal than the metal layer is;
the current collection terminal includes a base portion and a porous portion that is closer to the laminate film than the base portion is;
a resin layer including the inner resin layer is disposed between the base portion and the metal layer;
the porous portion and the resin layer contact each other; and
at least a part of the resin layer fills an interior of the porous portion.

2. The battery according to claim 1, wherein:
the current collection terminal contains aluminum; and
the porous portion is an alumite portion.

3. The battery according to claim 1, wherein the electrode body contains a solid electrolyte.

4. The battery according to claim 3, wherein the solid electrolyte is a sulfide solid electrolyte.

5. The battery according to claim 1, the current collection terminal further comprising a joining region wherein the current collection terminal is joined to the current collection tab.

6. The battery according to claim 5, wherein the porous portion is not formed at the joining region.

7. The battery according to claim 1, wherein the electrode body further comprising a current collector.

8. The battery according to claim 7, wherein the current collection tab is continuous with the current collector.

* * * * *